Nov. 30, 1948.　　　E. L. SCHOFIELD ET AL　　　2,454,842
BICYCLE KICK STAND
Filed Sept. 3, 1946
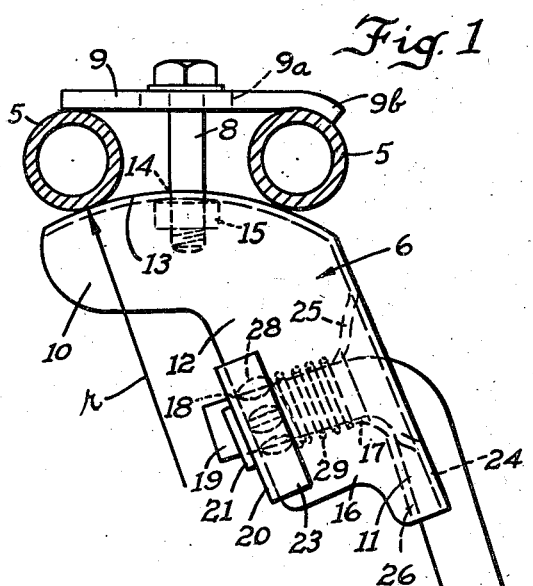
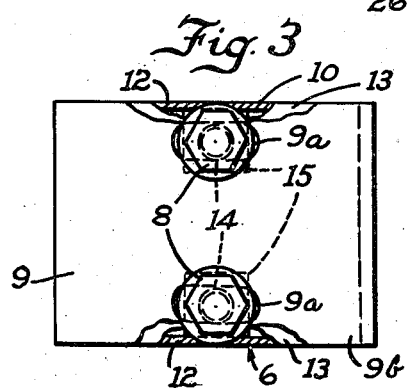
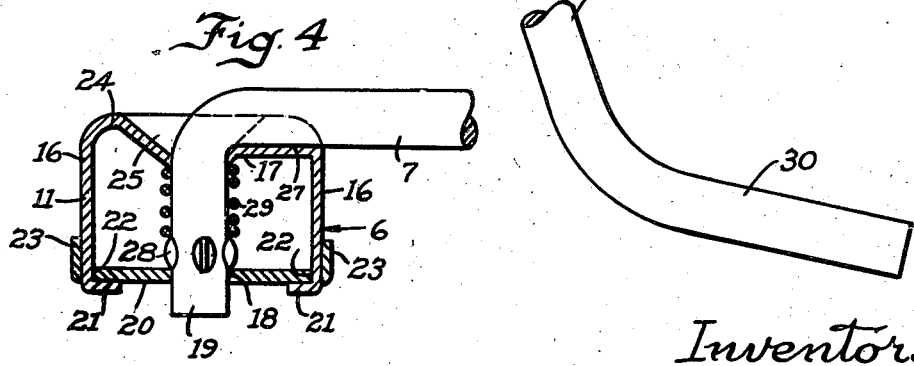
Inventors
Earl L. Schofield
Walter R. Lustig
Andrew F. Wintercorn
Atty Patented Nov. 30, 1948

2,454,842

UNITED STATES PATENT OFFICE 2,454,842

BICYCLE KICK STAND

Earl L. Schofield and Walter R. Lustig, Rockford, Ill., assignors to The Atwood Vacuum Machine Company, Rockford, Ill., a copartnership composed of Seth B. Atwood and James T. Atwood Application September 3, 1946, Serial No. 694,556

7 Claims. (Cl. 280—301)

1

This joint application is an improvement on the copending sole application of one of the present applicants, Earl L. Schofield, Serial No. 571,763, filed January 8, 1945, which was allowed September 6, 1946, but thereafter forfeited in favor of this application.

This invention relates to an improved bicycle stand of the well-known "kick" type, so named because of its being adapted to be kicked up out of the way.

The principal object of our invention is to provide an extremely serviceable stand of the kind mentioned which by reason of the use of stamped sheet metal parts throughout the bracket portion, and the fact that the bent rod forming the pivoted supporting leg or prop is designed to be assembled in the bracket with its biasing spring without the need for any drilling or tapping operations and without the need for any cotter pins, can be produced at much lower cost than other kick type stands now generally available.

Another important object of our invention is to provide a stand of the kind mentioned which may be easily adjusted on the bicycle to the exact angle desired and then rigidly attached thereto in that position, without danger of its turning relative to the frame or changing its angularity with respect to the frame, the stand being so designed to facilitate the tightening of the bolts by eliminating any possibility for the nuts to turn, thus permitting the tightening of the bolts with a single wrench.

The invention is illustrated in the accompanying drawing, in which

Fig. 1 is a front view of a bicycle stand made in accordance with our invention, illustrated as applied to the rear fork portion of a bicycle, which appears in section;

Fig. 2 is a face view of the recessed swivel bearing portion of the bracket;

Fig. 3 is a plan view of Fig. 1, and

Fig. 4 is a cross-section on the line 4—4 of Fig. 2.

The same reference numerals are applied to corresponding parts throughout these views.

In the kick type bicycle stand it has been common to provide a bracket suitably clamped to the substantially horizontal spaced bars 5 of the rear wheel fork, the bracket forming a support for the pivoted supporting leg or prop. The present bicycle stand is of that type, and the stamped sheet metal bracket 6, which pivotally supports the bent rod leg 7 for propping the bicycle, is fastened by means of a pair of bolts 8 and clamping plate 9 to the bicycle frame on the rear fork bars 5.

The bracket 6, in accordance with our invention, has the main body portion thereof stamped from a single piece of sheet metal to the flanged angular form shown, providing the substantially horizontal but arcuate clamping portion 10 and the recessed swivel bearing portion 11 that is inclined at a small angle from a vertical, as shown, the portions 10 and 11 being integrally connected and rigidly braced by the wide front and rear flanges 12. The arcuate top surface 13 is struck on the radius $r$, indicated in Fig. 1, and has line contact in substantially parallel lines with the bottoms of the bars 5 so that the bracket 6 may be easily adjusted to different angularities with respect to the frame of the bicycle and yet may be clamped securely to the frame in any one of its adjusted positions. The holes 14 for the bolts 8 are so spaced with respect to the flanges 12 that the square nuts 15 threaded on the lower ends of the bolts 8 have surface to surface contact with the inner sides of the flanges 12, as illustrated in Fig. 3, to prevent turning of the nuts and accordingly make it an easy matter to fasten the stand onto the bicycle, it being only necessary to turn the head of the bolts with a wrench without paying any further attention to the nuts 15 after they have been started onto the bolts. Taking into consideration the fact that devices of this kind are often applied by boys and girls who are more or less mechanically unskilled, the advantage of this feature can be better appreciated. The elongated slots 9a in the clamping plate 9 through which the bolts 8 are extended permit shifting of the bolts laterally with respect to the plate 9 as required in the angular adjustment of the bracket 6 relative to the frame, the one side edge portion 9b of the plate being curved downwardly, as indicated in Fig. 1, to conform to the curvature of the one bar 5 to locate the plate on the frame and resist sidewise or rotary displacement from its set position. The arcuate form of the clamping portion 10 of the bracket 6 combined with the fact that there are two bolts 8 for clamping it on the frame eliminates any danger of the bracket 6 turning from a set position. The arcuate form of the clamping portion 10 permits fastening of the bracket 6 to the bicycle with a single bolt, if desired, the bolt being entered through a slot in plate 9 midway between slots 9a and through a hole in the portion 10 midway between holes 14, without danger of the bracket turning relative to the frame about the single bolt as a center. However, if a single bolt is used the nut 15 used in connection therewith is preferably welded to the bottom side of the arcuate wall 13 so as to obviate any difficulty due to the nut tending to turn when the bolt is tightened, and to avoid necessity for holding the nut with one wrench while tightening the bolt with another wrench.

The flanges 12 on the recessed swivel bearing portion 11 of the bracket are much wider, as indicated at 16, in order to provide greater spacing of the swivel bearings 17 and 18 for the right-angled bent upper end 19 of the leg 7, an inner bearing plate 20 being provided to provide the bearing hole 18 and being secured to the inner edges of the flanges 12 by entering lugs 21 that project from the flanges 12 through slots 22 in the plate 20 and bending these lugs at right angles, as clearly appears in Fig. 4. The plate 20 is quite wide vertically in relation to the bearing hole 18 and has outwardly bent end portions 23 which fit snugly against the outer side of the flanges 12 to make for greater strength and rigidity, the lugs 21 being accordingly relieved of a certain share of the bearing load. The portion 11 of the bracket 6 has its web portion 24 substantially conically recessed, as indicated at 25, concentrically with the bearing hole 17 and is recessed radially with respect to the recess 25 at 26 and 27, at points approximately 90° apart, to locate the leg 7 in its lowered operative position when engaged in the recess 26 or in the raised out of the way position when engaged in the recess 27, as indicated in dotted lines in Fig. 2. The bent pivot end 19 of the leg 7 has four radially embossed portions 28 struck therefrom at circumferentially spaced points 90° apart adjacent the inner bearing plate 20 and these embossed portions define a shoulder annularly with respect to the cylindrical rod material of which the leg 7 is made for support of the inner end of a coiled compression spring 29, this spring being caged on the bent end 19 of the leg between the bearing 17 and the embossed portions 28. It is not even necessary to provide a washer as a seat for the inner end of the spring 29, although, of course, one may be provided if desired, in which event it would doubtlessly be unnecessary to provide as many embossed portions 28.

In assembling the present device the spring 29 is slipped over the rod forming the leg 7 from the bent lower end 30 that is adapted to rest on the sidewalk or other supporting surface when the bicycle stand is in use. The spring can be flexed enough to get it around the right angle bend onto the end portion 19. The leg 7 is then slipped through the bearing hole 17 and the spring 29 is finally compressed against the bearing 17 when the leg 7 reaches the assembled position shown. There remains then only the application of the inner bearing plate 20 to complete the assembly. Obviously, this construction can be produced at much lower cost than others now generally available, because of the elimination of costly drilling and tapping operations and the elimination of cotter pins which are more or less of a nuisance so far as assembling operations are concerned and are likewise a nuisance from the standpoint of hazard to the bicyclist, in addition to being apt to get rusty and drop out, allowing other parts to become disassembled. The wide spacing of the bearings 17 and 18 eliminates likelihood of binding even though the parts may not be lubricated, as often occurs. The important parts from the standpoint of maintaining the stand in good operative condition, namely the spring 29 and nut 15, are more or less protected from the weather by the bracket 6.

It is believed the foregoing description conveys a good understanding of the objects and advantages of our invention. The appended claims have been drawn to cover all legitimate modifications and adaptations.

We claim:

1. In a device of the character described, a one-piece sheet metal bracket bent to provide a substantially horizontal attaching portion, designed to engage the underside of a bicycle frame, and a downwardly and outwardly inclined perforated swivel bearing portion to receive a prop member, the two portions being rigidly interconnected and reinforced by opposed side flanges bent downwardly and inwardly from said attaching and bearing portions, a combination bearing and reinforcing plate of elongated form perforated intermediate the ends to receive the prop member and bent outwardly at opposite ends to provide end flanges, said plate being fastened to said bracket in transverse relation to the back of the bearing portion thereof abutting the edges of the flanges thereon, and with its end flanges abutting the outer faces of said flanges, an elongated prop member having a transverse upper end portion for pivotal support thereof designed to turn in the aforesaid perforations in said plate and in the swivel bearing portion of said bracket, and means for securing the attaching portion of said bracket to said bicycle frame.

2. In a device of the character described, a one-piece sheet metal bracket bent to provide an upper attaching portion, designed to engage the underside of a bicycle frame, and a perforated downwardly and outwardly inclined bearing portion adapted to receive a supporting leg in the bearing hole thereof, a one-piece cylindrical rod bent at opposite ends in opposite directions to form a supporting leg, the bent upper end portion constituting the pivot portion and being struck to provide circumferentially spaced embossed portions for abutment with a coiled spring, a coiled spring fitting closely on said rod around the bearing portion thereof and compressed between said embossed portions and the bearing portion of said bracket when the rod forming the supporting leg is assembled on said bracket, whereby said spring maintains the supporting leg in contact with the outer surface of said bearing portion of said bracket, and means for securing the attaching portion of said bracket to said bicycle frame.

3. In a device of the character described, a one-piece sheet metal bracket bent to provide an upper attaching portion, designed to engage the underside of a bicycle frame, and a perforated downwardly and outwardly inclined bearing portion adapted to receive a supporting leg in the bearing hole thereof, a one-piece cylindrical rod bent at opposite ends in opposite directions to form a supporting leg, the bent upper end portion constituting the pivot portion and being struck to provide circumferentially spaced embossed portions for abutment with a coiled spring, a coiled spring fitting closely on said rod around the bearing portion thereof and compressed between said embossed portions and the bearing portion of said bracket when the rod forming the supporting leg is assembled on said bracket, whereby said spring maintains the supporting leg in contact with the outer surface of said bearing portion of said bracket, said bracket having opposed side flanges bent inwardly from the bearing portion and downwardly from the attaching portion rigidly interconnecting and reinforcing said portions, a perforated bearing member receiving in its bearing hole the inner end portion of the pivot portion of said supporting leg and mounted on the inner edge portions of said flanges, and means for securing the attaching portion of said bracket to said bicycle frame.

4. In a device of the character described, a one-piece sheet metal bracket bent to provide an upper attaching portion, designed to engage the underside of a bicycle frame, and a perforated downwardly and outwardly inclined bearing portion adapted for bearing support of a supporting leg in the bearing hole therein, said bearing portion having opposed inwardly bent side flanges for reinforcement thereof, the upper ends of said side flanges merging with the attaching portion and being integral therewith, lugs projecting inwardly from said flanges, a sheet metal plate of elongated form extending across the back of said bearing portion of said bracket having slots provided therein to receive said lugs for attachment of said plate to said bracket, said lugs being bent at right angles against the back of said plate, the end portions of said plate beyond said slots being bent at right angles and abutting the outer faces of said flanges, said plate having a bearing hole provided therein in coaxial relation to the bearing hole in said bearing portion, a supporting leg having a bent end portion forming a pivot received in said bearing holes, and means for securing the attaching portion of said bracket to said bicycle frame.

5. A device as set forth in claim 4, wherein the supporting leg is formed from a cylindrical rod, the bent upper end portion of said rod forming the pivot portion being struck intermediate the ends of said pivot portion to provide a plurality of circumferentially spaced embossed portions to serve as abutments for the inner end of a coiled spring, and the device including a coiled compression spring fitting closely on said pivot portion and compressed between the bearing portion of said bracket and said embossed portions when the supporting leg is disposed in assembled relation to the bracket, said plate being affixed to said bracket in assembled relation to the inner end portion of the pivot portion of said rod behind said embossed portions.

6. In a device of the class described, an inverted generally L-shaped bracket one substantially horizontal leg of which is arcuately curved and designed to engage the bottoms of two spaced apart substantially horizontal bicycle frame members with freedom for slidable angular adjustment transversely relative to said members, the engagement described prohibiting turning of the bracket while in operative position relative to the frame members on an axis in transverse relation to the axis of angular adjustability, a prop member secured to the other upright leg of said bracket, a clamping plate designed to engage the tops of said frame members and having one or more elongated slots provided therein extending in transverse relation to the frame members, and clamping bolt means extending through and laterally adjustable in said slots provided in the plate and extending through registering holes provided in the horizontal leg of the bracket.

7. In a device of the class described, an inverted generally L-shaped bracket one substantially horizontal leg of which is arcuately curved and designed to engage the bottoms of two spaced apart substantially horizontal bicycle frame members with freedom for slidable angular adjustment transversely relative to said members, the engagement described prohibiting turning of the bracket while in operative position relative to the frame members on an axis in transverse relation to the axis of angular adjustability, a prop member secured to the other upright leg of said bracket, a clamping plate designed to engage the tops of said frame members and having one or more elongated slots provided therein extending in transverse relation to the frame members, said bracket being of sheet metal construction and the two legs being formed from a single piece of sheet metal bent to L-shaped form and having flanges bent inwardly from the opposite side edge portions to substantially parallel relation to reinforce and rigidify the bracket, and means for securing the plate to the horizontal leg of the bracket comprising one or more bolts entered through and laterally adjustable in the slots provided in the plate and extending through registering holes provided in the bracket leg, and a nut threaded on each of said bolts, one of said cooperating bolt and nut parts having surface to surface contact with the inner face of the adjacent flange to hold the same against turning whereby to facilitate tightening of said bolt.

EARL L. SCHOFIELD.
WALTER R. LUSTIG.

No references cited.